W. M. FERRY, Jr.
SAWMILL.
No. 32,418. Patented May 28, 1861.
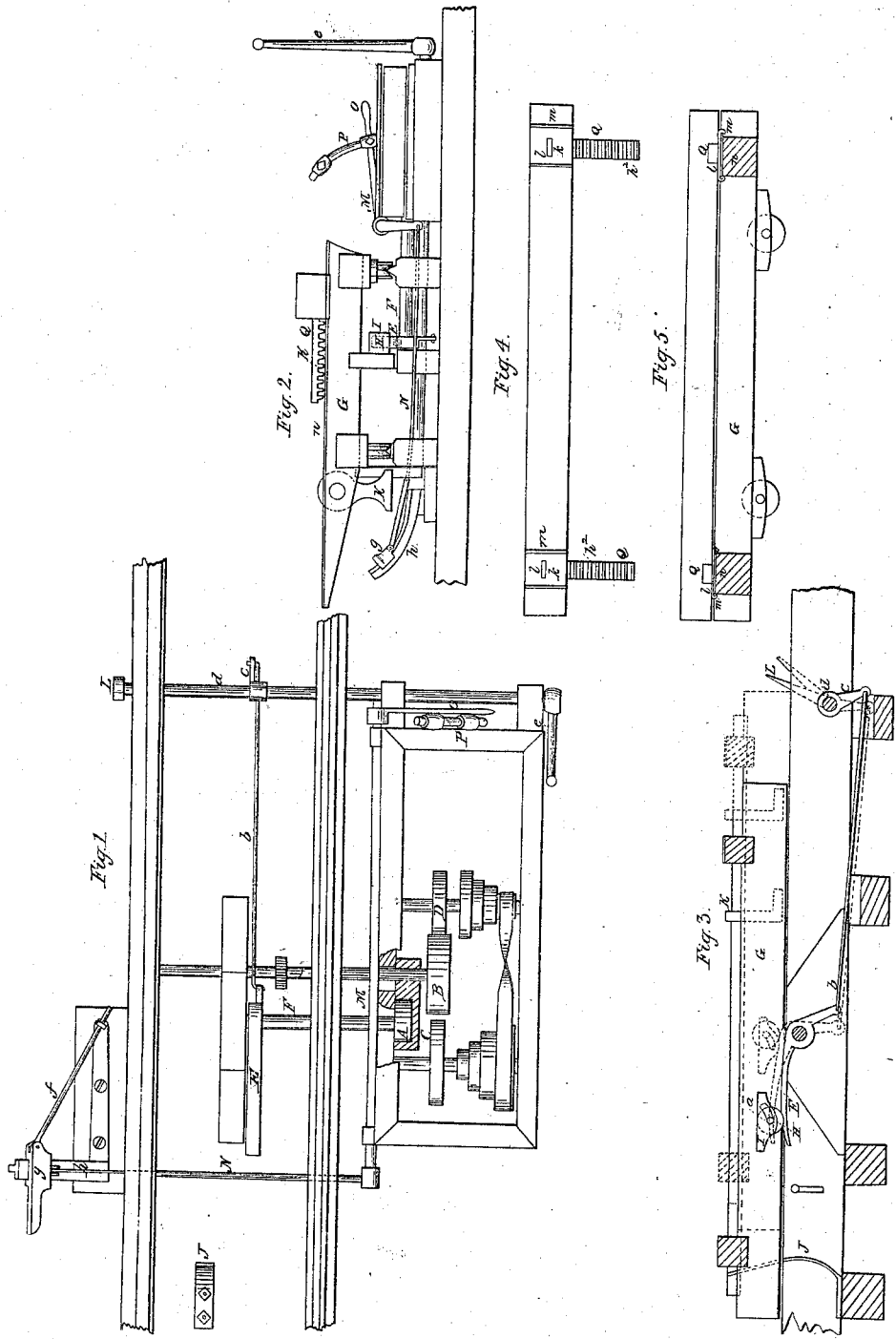

UNITED STATES PATENT OFFICE.

WILLIAM M. FERRY, JR., OF FERRYSBURG, MICHIGAN.

SAWMILL.

Specification of Letters Patent No. 32,418, dated May 28, 1861.

*To all whom it may concern:*

Be it known that I, WILLIAM M. FERRY, Jr., of Ferrysburg, in the county of Ottawa and State of Michigan, have invented a new and useful Improvement in Sawmills; and I do hereby declare that the following is a full, clear, and exact description of the same, reference being had to the accompanying drawings, forming a part of this specification, in which—

Figure 1, is a plan of a saw mill with my improvements applied to it. Fig. 2, is a head or end view. Fig. 3, a vertical longitudinal section of the same, and Figs. 4 and 5, are detail views of the head block, rack bars and carriage.

Similar letters of reference, in each of the several figures indicate corresponding parts.

My present improvements are designed for use in connection with the sawmill patented to me July 21, 1857 and the nature of the same consists, 1st, in a peculiar device for automatically reversing the motion of the carriage. 2nd, in a peculiar device for regulating from the head of the saw mill the thickness of the slabs or planks cut from the log. 3rd, in a combination of peculiar devices of confining the rack bars to the head block and the head block to the carriage.

To enable others, skilled in the art, to make and use my invention, I will proceed to describe its construction and operation. My first improvement is as follows: The saw patented to me at the date before named has its carriage reversed automatically by means of an eccentric A, friction pulleys B, C, D, and certain stops and tripping devices hereinafter named, and in lieu of the tail end of the tripping device, as shown in said patent, I now employ in combination with the eccentric A, friction rollers or gearing B, C, D, and head end tripping device, an angular shaped trip E, which is secured permanently to the inner end of the shaft F, of the eccentric A, and arranged so as to come nearly under the center of the carriage, G. The horizontal or upper portion of said trip is made with a slight curve. I also employ a friction roller H, the same being hung on the central timber of the carriage in an eccentrically slotted box I, the journal of the roller playing loosely in the curved eccentric slot $a$, of the box, as presently described. And to the vertical or lower end of the trip $a$, rod $b$, is attached; said rod extending therefrom to an arm $c$, of a rock shaft $d$, situated at the head of the saw mill and having a hand lever $e$, attached to it.

The operation of this feature of my present invention, is as follows: The trip being adjusted to the position shown in red and the friction roller B, in contact with C, the carriage in traveling forward passes over the trip and consequently the friction roller comes in contact with it, but fails to operate upon it until its journal has risen or assumed the position in the eccentric slot, shown in red, when it depresses the trip sufficiently to cause the eccentric A, to throw the friction roller B, out of contact with C. As soon as the roller escapes beyond the trip, it descends a short distance—the eccentric slot allowing it to do so. The carriage at this stage, is stopped by coming suddenly in contact with a spring stop J, and as it recoils from the action of the spring stop, the friction roller H, rises again on the curved trip, as illustrated in black lines, and the journal of the roller having no chance at this stage of the operation to change its position in the slot, the roller causes the trip to descend, and in doing so, eccentric A, is made to throw the friction wheel B, in working contact with D, and thus insure a gigging back of the carriage. When the carriage is on the eve of completing its back movement, the suspended adjustable stop K, (which is shown in my patent of July 21, 1857) strikes the head end trip L, of the rock shaft $d$, and as said rock shaft and the trip E, are connected together by the rod $b$, the trip E, is caused to again assume the position shown in red, and simultaneously with this, the eccentric moves the friction roller in working contact with C, and thus reverses the carriage and causes it to again move forward.

My second improvement is as follows: In my patent of July 21, 1857, there is also shown an arrangement for controlling automatically the thickness of the slabs or strips cut from the logs. This arrangement consists of an oblique rod $f$, a gage slide $g$, made adjustable by a set screw on curved guide $h$, and a pivoted lever pawl for operating the feeding gear of the head block. I now dispense with the set screw for adjusting the gage slide and employ in lieu thereof, a rock shaft M, which leads from the head to the tail end of the saw mill and connects by means of a rod N, with the gage slide $g$. The rock-shaft has a hand lever O, on its front end, and said lever is held in place on a segment bar P, by means of adjustable sleeves and set screws, as represented. With this arrangement, the sawyer can change instantly and accurately from the head of the machine, the position of the inclined gage slide so that different thicknesses of lumber may be selected from the log without requiring the attention of an assistant at the gage slide, as the mechanism is situated near to and convenient for the head sawyer to operate it. He also can readily vary the thickness of each of the several kinds of lumber usually cut, as may be necessary— that is to have, for instance "scant" $\frac{1}{2}$ or "plump" $\frac{1}{2}$, "scant" 1 inch or "plump" 1 inch, &c. The series of adjustable notched sleeves which are on the segment, serve to retain the lever and the gage slide in any desired position.

My third improvement is as follows: The rack bars Q, Q, have each a tenon $k$, formed on their lower side, and are secured to the head block by being let into grooves and clamped down by means of slotted flanged plates $l$, $l$, the tenons passing up through the slots of the plates as shown. The head block with the racks thus attached to them are secured to the carriage by means of the segment shaped flanges $m$, $m$, of the plates $l$, said flanges fitting under the edges of metallic capping plates of the cross timbers $n$, $n$, of the carriage—with this construction a rigid connection between the head blocks and set racks is effected, and at the same time the head block is held from canting.

What I claim as my invention and desire to secure by Letters Patent, is—

1. The slotted box I, and roller H, for the purpose of actuating the mechanism used in reversing the motion of saw-mill carriages substantially as set forth.

2. The combination of the slotted box I, and the roller H, with the tripping devices E, L, stop-spring J, lever $e$, rock-shaft $d$, and connecting rod, $b$, substantially in the manner and for the purpose described.

3. The combination of the hand lever O, rock shaft M, jointed connecting rod N, gage slide $g$, and hinged adjustable oblique bar $f$, substantially in the manner and for the purpose described.

4. Effecting a combination between the set rack bars Q and head block and also the carriage, G by means of the tenon $k$, and flanged plates $l$, $l$, in the manner and for the purpose herein described.

WM. M. FERRY, Jr.

Witnesses:
 B. F. EAMES,
 EDWARD SWEENEY.